United States Patent [19]

Rhodes

[11] Patent Number: 5,020,077
[45] Date of Patent: May 28, 1991

[54] MODEM AND DATA COMMUNICATION SYSTEM

[75] Inventor: Scott A. Rhodes, Marangaroo, Australia

[73] Assignee: Transcom Australia Limited, Western Australia, Australia

[21] Appl. No.: 347,885

[22] PCT Filed: Aug. 20, 1987

[86] PCT No.: PCT/AU87/00280
§ 371 Date: Apr. 21, 1989
§ 102(e) Date: Apr. 21, 1989

[87] PCT Pub. No.: WO88/01458
PCT Pub. Date: Feb. 25, 1988

[30] Foreign Application Priority Data

Aug. 22, 1986 [AU] Australia ............................ PH 7606

[51] Int. Cl.⁵ .............................................. H04B 1/38
[52] U.S. Cl. .................................... 375/8; 455/73
[58] Field of Search ........................ 375/7, 8, 9, 45, 80, 375/81, 82, 88; 329/50, 110, 122; 455/73, 205, 208; 379/98

[56] References Cited

U.S. PATENT DOCUMENTS

| | | | |
|---|---|---|---|
| 4,425,665 | 1/1984 | Stauffer | 332/9 R |
| 4,475,216 | 10/1984 | Noguchi | 375/45 |
| 4,551,846 | 11/1985 | Takeda et al. | 375/88 |
| 4,596,022 | 6/1986 | Stoner | 329/110 |
| 4,627,078 | 12/1986 | Stoner | 375/45 |
| 4,785,255 | 11/1988 | Lucak et al. | 375/88 |

Primary Examiner—Douglas W. Olms
Assistant Examiner—Stephen Chin
Attorney, Agent, or Firm—Reising, Ethington, Barnard, Perry & Milton

[57] ABSTRACT

A modem (18) and data communication system (10) particularly for operation in high frequency (HF) media. The modem (18) comprises an audio period timer (52) to detect cycles of data from a received signal, a bandwidth window (62) to flag undefined cycles UD so as to prevent such cycles UD from further influencing decoding decisions, a bit rate timer (57) to predict ends of bits of byte formed from a plurality of said cycles, a bit rate synchronizer (76) to establish bit-wise synchronisation of the modem (18) with the received signal, a byte synchronizer to establish byte-wise synchronisation.

12 Claims, 8 Drawing Sheets

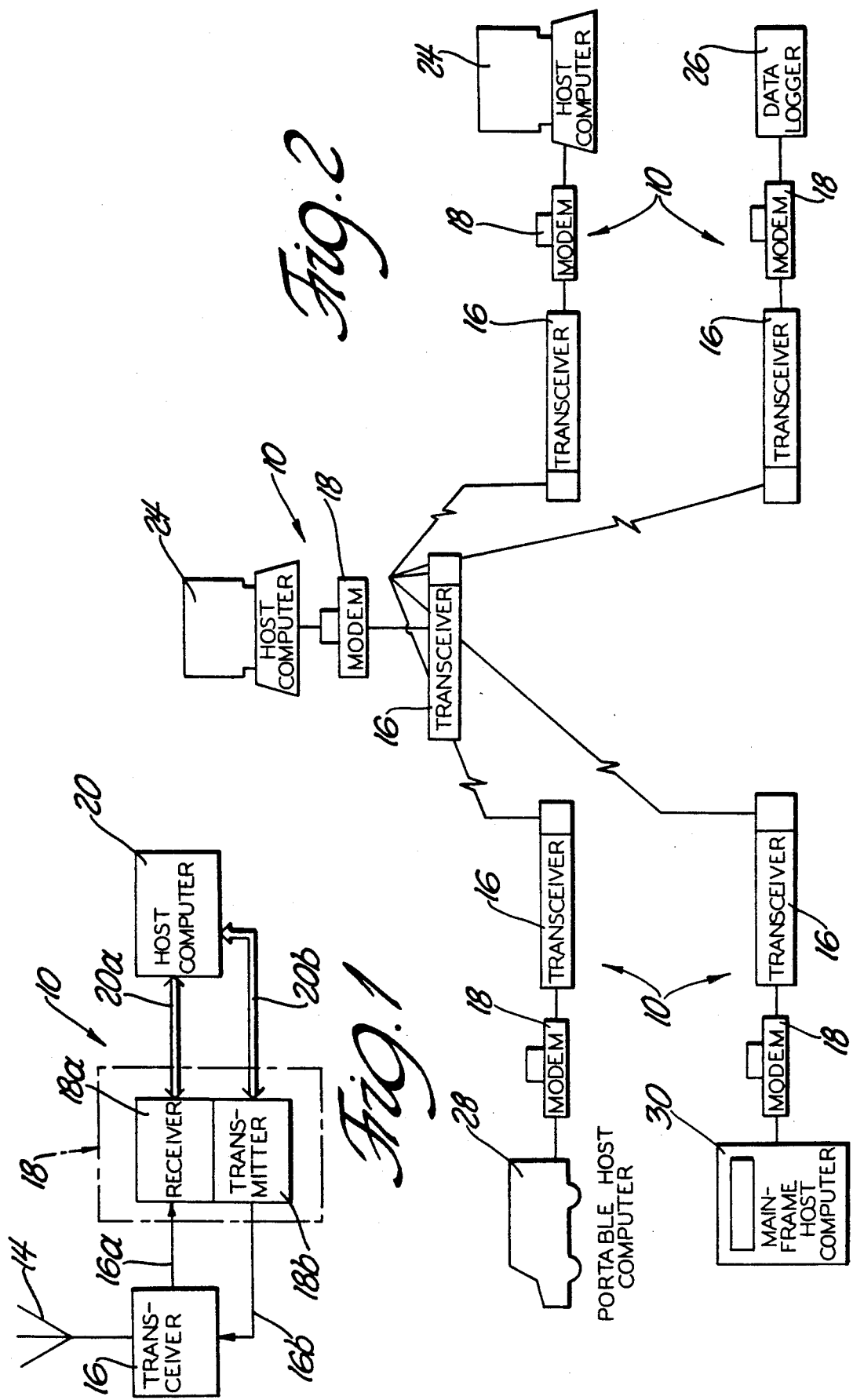

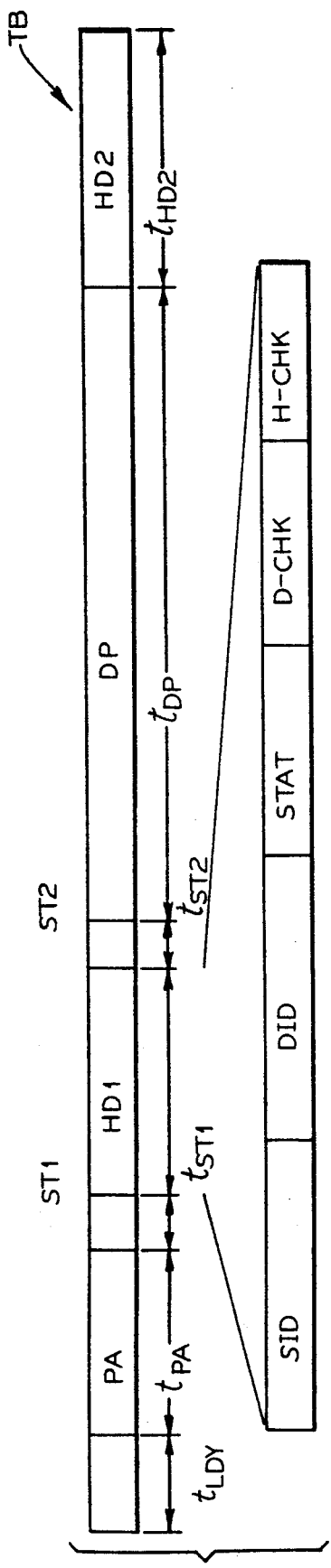
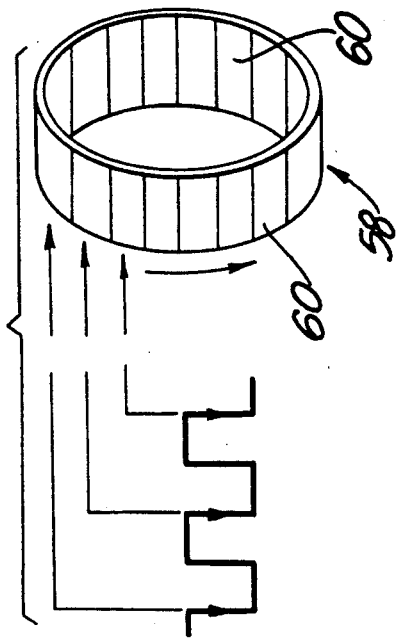
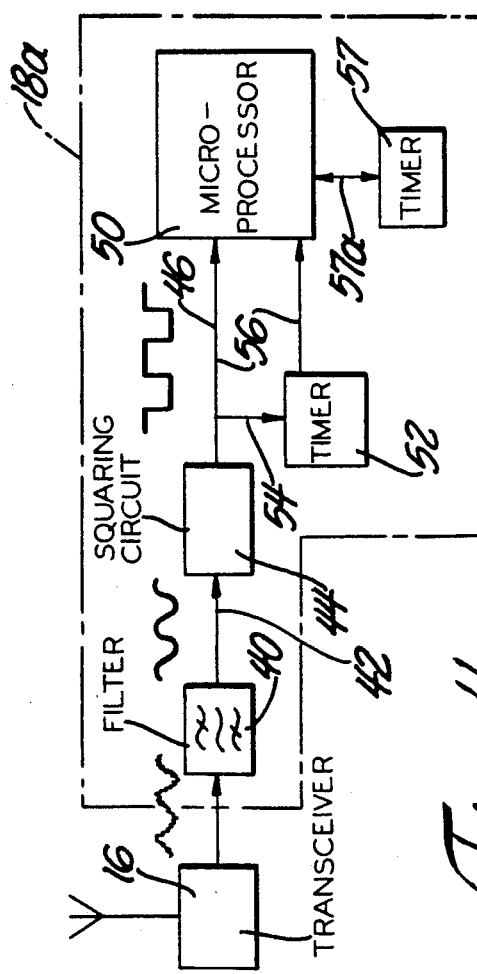
Fig. 3
Fig. 5
Fig. 4

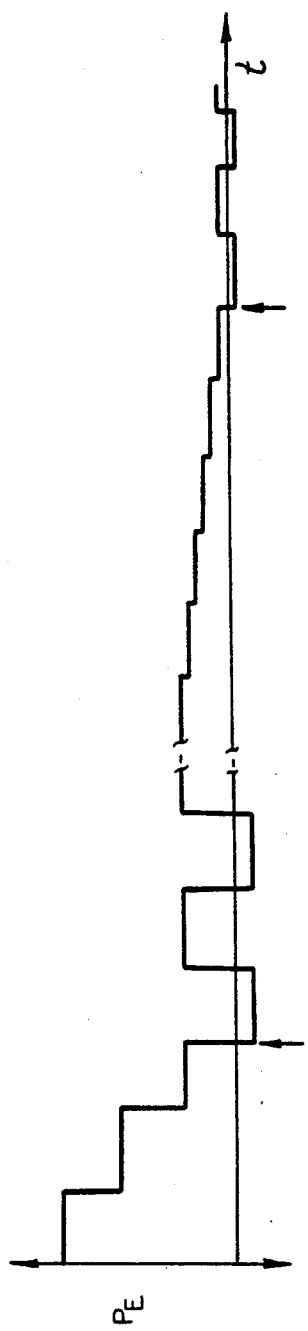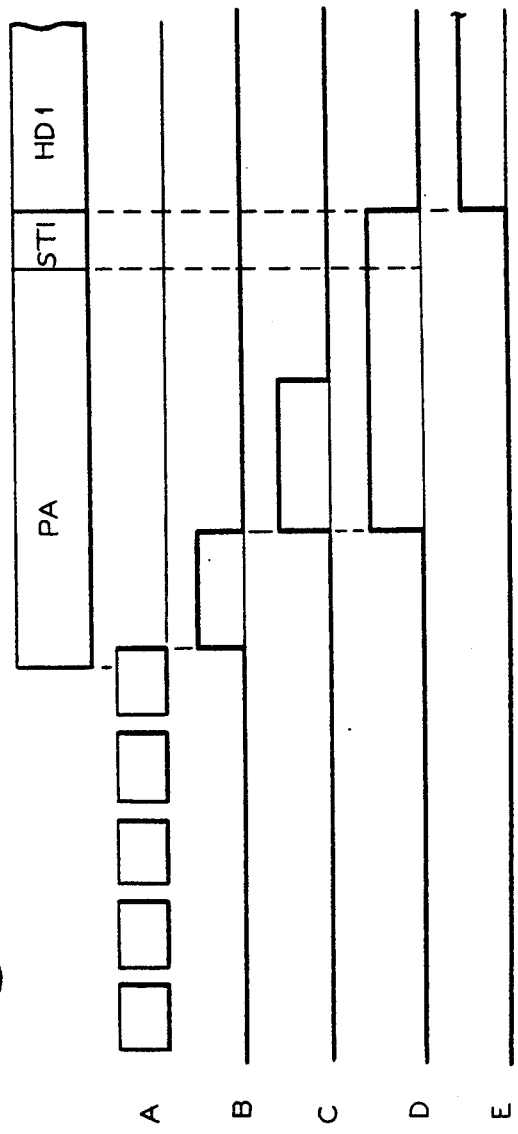

MODEM AND DATA COMMUNICATION SYSTEM

DESCRIPTION

The present invention relates to a modem and data communication system, particularly envisaged for use in (HF) transmission media although it is also very well suited to operate in higher frequency media.

FIELD OF THE INVENTION

In general, data communication in non directive medium such as air is conducted over relatively short distances and at relatively high speed and relatively high frequency. The form of data communication channels employed in air tend to limit the distances that can be transversed, usually to line of sight, as in microwave links and the like. Larger communication distances have been attained with lower frequency communication channels, such as, for example, very high frequency (VHF).

Typically, prior art modems have been designed to operate at VHF or ultra high frequency (UHF) or microwave frequencies or over guided media such as telephone and coaxial cables. Such prior art modems were designed primarily to attain good transmission speed. The electrical conditions and characteristics of the electromagnetic media used by the prior art modems are substantially constant.

In contrast communication over HF media is complicated by constantly varying and unreliable electrical conditions and characteristics. These complications include burst noise, flutter fading, frequency drift, delay distortion or multi pathing and a generally greater level of noise than other more conventional media. Such noise includes uncorrelated random noise originating predominantly from stratospheric disturbances of the propagation wave, receiver input thermal processes, and intermediate frequency thermal processes. This noise is similar to band limited white noise. Noise also includes correlated random noise originating from atmospheric disturbances, adjacent channel cross talk, ignition noise and the like. This noise is characterized by strong burst wise occurrences and manifests itself in the form of short and strong periods of noise superimposed on the signal.

Conventional modem designs are generally incapable of compensating for the complexities of HF media and consequently attempts to modify conventional modems to HF use have generally been unsuccessful.

The attraction of modem design to HF media is that data may be transmitted between base and remote or mobile terminals over long distances (in excess of 10,000 kms) and at a considerable cost advantage to other media.

Another attraction of HF media is less costly installations and less crowded communication band.

However, the problem to date has been recovery of transmitted data and privacy of such data.

SUMMARY OF THE INVENTION

The present invention provides a modem and data communication system employable on high frequency channels to communicate data over relatively long distances. In accordance with one aspect of the present invention there is provided a modem for a data communication system, A modem for a data communication apparatus, said modem being arranged for connection between a source of band limited audio logic such as a radio transceiver and a host computer, the modem characterized in that it comprises:

(A) a data receiver having:

(a) a band pass filter having an input arranged to be connected to the source of band limited audio logic;

(b) a squaring circuit connected to an output of the band pass filter to produce a substantially square wave signal comprising a plurality of cycles with rapid zero crossings, said cycles forming logic bits of data with changes of state between a logical high and a logical low value and said logic bits of data forming logic bytes of data;

(c) an audio period timer connected to an output of the squaring circuit and configured to develop a count indicative of the time delay between consecutive zero crossing in the same direction;

(d) a bandwidth window configured to receive the count from the audio period timer, and to filter the counts;

(e) a bit rate timer configured to develop a further count and to issue an interrupt signal to predict when the bits of data have one of the changes of state from a logical high to a logical low and vice versa;

(f) a bit rate synchronization means responsive to said changes of state of the data bits and configured to alter the bit rate timer when the predicted time at which said changes of state occur does not coincide with the actual changes of state, so as to establish bit-wise synchronous communication;

(g) a byte synchronization means responsive to a particular string of bits to establish byte-wise synchronous communication;

(h) an error detection means configured to detect errors in said bits and said bytes and to flag such detected errors with an error code or codes; and (B) a data transmitter having:

(a) generator means to generate said cycles for said bits of data; and (b) lower pass filter means connected to receive the cyles from the generator means to filter out high frequency components from the generated cycles to produce a bandlimited audio frequency logic signal.

In accordance with a further aspect of the present invention there is provided a data communication system characterized in that it comprises a transceiver, a computer means and a modem connected therebetween, the modem being characterized in that it comprises:

a modem for a data communication apparatus, said modem being arranged for connection between a source of band limited audio logic such as a radio transceiver and a host computer, the modem characterized in that it comprises:

(A) a data receiver having:

(a) a band pass filter having an input arranged to be connected to the source of band limited audio logic, (b) a squaring circuit connected to an output of the band pass filter to produce a substantially square wave signal comprising a plurality of cycles with rapid zero crossings, said cycles forming logic bits of data with changes of state between a logical high and a logical low value and said logic bits of data forming logic bytes of data;

(c) an audio period timer connected to an output of the squaring circuit and configured to develop a count indicative of the time delay between consecutive zero crossing in the same direction;

(d) a bandwidth window configured to receive the count from the audio period timer, and to filter the counts;

(e) a bit rate timer configured to develop a further count and to issue an interrupt signal to predict when the bits of data have one of the changes of state from a logical high to a logical low and vice versa;

(f) a bit rate synchronization means responsive to said changes of state of the data bits and configured to alter the bit rate timer when the predicted time at which said changes of state occur does not coincide with the actual changes of state, so as to establish bit-wise synchronous communication;

(g) a byte synchronization means responsive to a particular string of bits to establish byte-wise synchronous communication;

(h) an error detection means configured to detect errors in said bits and said bytes and to flag such detected errors with an error code or codes; and (B) a data transmitter having:

(a) generator means to generate said cycles for said bits of data; and (b) lower pass filter means connected to receive the cycles from the generator means to filter out high frequency components from the generated cycles to produce a bandlimited audio frequency logic signal. The present invention will hereinafter be described with particular reference to SSB HF communication and channels although it is to be understood that others could be used.

BRIEF DESCRIPTION OF THE DRAWINGS

The present invention will now be described, by way of example, with, reference to the accompanying drawings, in which:

FIG. 1 is a block diagram of a data communication system in accordance with one aspect of the present invention comprising a modem in accordance with a further aspect of the present invention;

FIG. 2 is an exemplary arrangement of the data communication, system of FIG. 1;

FIG. 3 is a preferred data protocol for use with the modem of FIG. 1;

FIG. 4 is a block diagram of a data receiver of the modem of FIG. 1;

FIG. 5 is a diagram of an audio storage stack of the data receiver of FIG. 4;

FIG. 9 is a graph of bit rate synchronization for the bit rate synchronizer means of FIG. 7, showing fast and slow regions of lockup with received logic bits, phase error being shown on the ordinate axis and time in 3 ms divisions being shown on the abscissa axis;

FIG. 10 is a timing diagram exemplary of bit and byte synchronization processes for the data receiver of FIG. 4;

DESCRIPTION OF THE INVENTION

Figure 6:
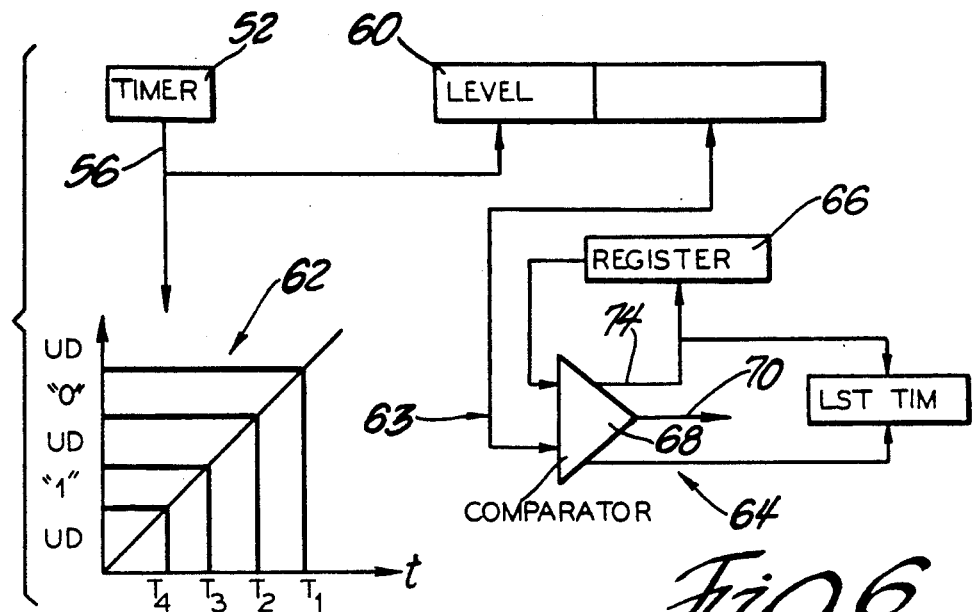
FIG. 6 is a diagram of a digital audio software bandwidth window and a clock extraction means of the data receiver of FIG. 4.

In FIG. 1 there is shown a data communication system 10 comprising an antenna 14, to collect and radiate signals and connected to a radio transceiver 16 to receive and transmit the signals and modem 18 to interface the radio transceiver 16 with a host computer 20 or the like.

In the present embodiment the antenna 14 is constructed to collect and radiate high frequency (HF) radio signals over HF communication channels, such as, for example, air. The radio transceiver 16 is, in the present embodiment, in the form of a HF transceiver and turnable substantially to the frequencies in the HF band. Preferably, the radio transceiver 16 is a conventional transceiver of the simplex single side band (SSB) type for communication over voice channels.

It is to be understood that the modem 18 of the present invention is designed to compensate for the especially difficult transmission and reception of data over HF communication channels. Accordingly, the modem 18 is readily applicable in use with other communication media, such as, for example, HF citizen band (CB) radio with amplitude modulation (AM) or VHF or UHF with Frequency Modulation (FM) or land lines or the like.

The modem 18 comprises a data receiver 18a and a data transmitter 18b. The data receiver 18a is fed with an audio signal generated at an output 16a of the transceiver 16 by demodulation of an HF signal collected by the antenna 14. The data receiver 18a is connected to the host computer 20 via an input output (I/0) port 20a such as, for example an RS232 serial input port or an STD computer bus standard port or an IBM computer bus standard port or the like, through which the host computer 20 receives data derived from the HF signal. The host computer 20 is connected to the data transmitter 18b via the I/O port 20a and transfers data to the data transmitter 18b thereby. The data transmitter 18b is connected to an input 16b of the transceiver 16 to send encoded data for transmission by the transceiver 16. The signals appearing at the output 16a and the input 16b are voice frequency audio logic data signal respectively corresponding to received audio logic data and transmit audio logic data.

Preferably, the audio logic data signals have frequencies of about half of the audio bandwidth of the radio transceiver 16, i.e. about 1500 Hz.

Conveniently, logical high bits of data are designated by an audio frequency of about 1585 Hz and logical low bits of data are designated by an audio frequency of about 1415 Hz. The frequency representations of the logical high and low bits being about 170 Hz apart. Such frequencies have been chosen as being well within the capability of conventional radio transceivers.

It is to be understood that other frequency representations could be used.

In the context of the present embodiment each bit of data has a length of about 3 ms duration and comprises a plurality of cycles of audio frequency. For example, a logic high bit is conveniently represented by 5 cycles of 1585 Hz audio (about 3.15 ms duration) whilst a logic low bit is conveniently represented by 4 cycles of 1415 Hz audio (about 2.83 ms duration). It is important that the two frequencies, one each for logical high and logical low bits be evenly spaced about the nominal 1500 Hz chosen, so as to give an equal error immunity to both logical bits. Here the spacing has been chosen to be 85 Hz.

A 3 ms duration for logic data bits has been chosen as a compromise between bit speed and bit recoverability. Smaller durations are desired for greater speed and larger durations are desired for more reliable bit recovery. Other durations for the logic data bits could be used.

Further, in the context of the present embodiment a byte of data comprises 7 data bits and 3 parity bits. The calculation of the 3 parity bits is discussed hereinafter. In FIG. 2 there is shown a data communication network 22 comprising a plurality of the transceivers 16 and the modems 18. Respective ones of the radio transceivers 16 are connected to respective ones of the modems 18 and thereby to various types of host computer 20. The types of host computers 20 may include personal type host computers 24, data loggers 26, mobile or portable type host computers 28, mainframe type host computers 30 and the like. The mobile or portable type host computers 28 may include radio data transmission/control units, mobile printer units, intelligent hand held messaging key pad/display units and the like.

In the data communication network 22 data may be transmitted over relatively great distances, such as inter continental distances, and between any of the data communication apparatus 10 in the network 22.

The modems 18 are designed to operate on transmission formats including SELCALL point to point contact (i.e. are you there status), SELCALL +TEXT including short message text (quick transmission) and MESSAGE TEXT of any length. Since HF communication media are difficult environment for communication of data a preferred data protocol for transmission blocks TB's has been developed. The data protocol comprises a PRE-AMBLE PA, followed by a FIRST START ST1 byte, then FIRST BLOCK HEADER bytes HD1, then a SECOND START byte ST2, then a DATA PACKET DP and SECOND BLOCK HEADER bytes HD2 as shown in FIG. 3. The data protocol may also comprise a lead in delay LDY following enabling of the radio transceiver 16 for transmission.

Typically the components of the data protocol have the following timing ranges:

| | MIN | MEAN | MAX | (ms) |
|---|---|---|---|---|
| tLDY—leading delay | 50 | 150 | 500 | |
| tPA—pre-amble duration | | 180 | | |
| tST1—first start byte duration | | 30 | | |
| tHD1—first block header duration | | 210 | | |
| tST2—second start byte duration | | 30 | | |
| tDP—data pocket duration | 0 | 3840 | 7650 | |
| tHD2—second block header duration | | 210 | | |

The modem 18 uses data in SHORT transmission blocks and in LONG transmission blocks. The former are used as calling . blocks and confirmation signaling blocks and have a data packet length of zero, whilst the latter are used for transmission of variable data information (message text or SELCAL text).

The pre-amble PA preferably comprises 6 bytes of data of the form 1010101 with a parity calculated to be 010. Such pre-amble PA structure is preferred to maximize the number of transitions from high to low to aid in bit synchronization for the modem 18, as discussed hereinafter. Where the number of such transitions is less than the maximum, the rate at which the modem 18 achieves bit synchronization is correspondingly lessened. The first start byte ST1 comprises a unique byte, such as for example, 01 hex for SHORT BLOCKS and 03 hex for LONG BLOCKS. The first start byte ST1 is used by the modem 18 to aid in byte synchronization for incoming received data. The first block header of bytes HD1 conveniently comprises 7 bytes of data including a sender identification code SID of two bytes, a destination identification code DID of two bytes, a single status byte STAT, a data checksum byte D-CHK and a header checksum byte H-CHK.

Preferably, the bytes in the block headers HD1 and HD2 are 1±s complemented so that their bit pattern does not conflict with the start bytes ST1 and ST2.

The sender identification code SID identifies the modem 18 which is transmitting. It is envisaged that the sender identification code SID may comprise a fleet code of two bits such that only modems 18 with identical fleet codes may communicate.

The destination identification code DID identifies the modem 18 to which the data is desired to be transmitted. It is envisaged that the destination identification code DID may comprise a group code of two bits such that a plurality of the modems 18 are desired to be transmitted to. The status byte STAT comprises bits to identify the type of transmission block TB which is to be transmitted. For example whether the transmission block TB is a start of message call or a start of message confirmation or an end of message call or an end of message confirmation or a SELCALL call block or a SELCALL confirmation or an END command or alternative data block ID status or a data pocket valid confirmation or the like.

The data checksum D-CHK is a 7 bit rotated exclusive O Red checksum of data in the data pocket DP of the transmission block TB. Where the transmission block TB is a SHORT BLOCK there is no data and the data checksum D-CHK has a value of 000.

Where only a single byte of data is to be transmitted it may be put in the data checksum D-CHK byte of a SHORT block. The header checksum H-CHK is similarly a 7 bit rotated exclusive ORed checksum, but of all the bytes contained in the header HD1 for the present transmission block. The second start byte ST2 is similar to the first start byte ST1 except that SHORT blocks are conveniently designated 02 hex and LONG blocks are designated 04 hex so as to be distinguishable from the first start byte ST1. If the first start byte ST1 is not received then nor will the first block header HD1. The second start byte ST2 uses different designated bytes to the first start byte ST1 so as to indicate that the block header HD1 was not properly received.

The data pocket DP appears only in a LONG block. Preferably data packets DP's have a fixed length, such as, for example, 128 bytes although other lengths could be used, say for example, between 2 and 255 bytes.

The second block header HD2 is identical to the first block header HD1 to give two chances for the modem 18 to receive a valid error free block header. If a valid block header is not received the transmission block TB must be descarded since it may have not been intended for reception by the modem 18 in question.

In the data protocol each byte has a parity of 3 bits to allow individual bytes to be checked for errors and flagged if errors are detected. This represents a first level of error detection for the data communication system 10 of the present invention. The parity bits are determined from a tally of all logic one bits within the 7 other bits of the byte.

The protocol also provides information to a destination modem 18 regarding the clock frequency of a source modem 18. Such information is provided from determination of transistors in data from logic highs to logic lows. Accordingly, it is undesirable to have continuous strings of one logic value as may occur with conventional parity bits. The present invention has parity bits as described above and offset by a predetermined value so that a byte having 0000000 bits would have parity bits of other than 000, say, for example 001. Such offset also provides eruption of the data. The data and header check sums D-CHK and H-CHK may also comprise offset values.

However, data byte parity is only about 88% reliable under noisy conditions. Therefore, the modems 18 comprise further error detection means such as dynamic group length data byte error marking described hereinafter.

The data protocol of the present invention allows synchronous data byte transmission between modems 18 so that the receiving modem 18 may conduct predictive positioning (described hereinafter) of every data bit and every data byte. This provides individual byte retrieval and provides information as to the location of a corrupted byte in the transmission block TB.

Such, error detecting mechanisms are required in the data protocol to attempt to meet the difficulties encountered with HF media, such as, signal fading and signal interference and noise.

The receiver 18a shown in FIG. 1, comprises a band pass filter 40 connected to the output 16a. Conveniently, the filter 40 is a bi-quad active filter configured to filter out frequencies below 1415 Hz and above 1585 Hz. Such filtered frequencies include some noise components and modulation caused by multipathing and the like.

The filter 40 comprises an output 42 having an audio voltage signal consisting of bursts of audio about 1415 Hz corresponding to logical low data and bursts of audio about 1585 Hz corresponding to logical high data. The output 42 may also have audio bursts at frequencies which depart from these predetermined frequencies by amounts of up to several hundred Hz.

The output 42 is connected to a squaring circuit 44, such as a zero crossing detector, configured to detect a transition in the audio signal through zero volts. The transition being either a positive to negative voltage transition or a negative to positive voltage transition.

The squaring circuit 44 comprises an output 46 having a voltage signal of a digital nature, having high levels, low levels and transitions therebetween corresponding to digital data cycles.

The output 46 is connected to a microprocessor 50 of conventional type which is programmed to filter, decode, and reconstruct the received digital data cycles.

In the present embodiment falling edges of the digital data cycles at the output 46 are acted upon by the microprocessor 50.

The receiver 18a also comprises an audio period timer 52 having an input 54 connected to the output 46 of the squaring circuit 44. The audio period timer 52 has an output 56 connected to the microprocessor 50. The audio period timer 52 counts at a fixed rate between consecutive falling edges of the digital data cycles. The count so achieved is representative of the period of a respective one of the digital data cycles and hence its frequency. For example, the relationship between the count and the frequency of the digital data cycle could be: cycle frequency $$\text{cycle frequency } f = \frac{2\ 000\ 000\ \text{Hz}}{\text{audio period timer count}}$$

The microprocessor 50 has a timing crystal which in the present embodiment has a frequency of 2 MHz and which relates the count of the audio period timer 52 to cycle frequency.

The receiver 18a also comprises a bit rate timer 57 connected to the microcomputer 50 via an output 57a.

Conveniently, the bit rate timer 57 is a down counter having a maximum count and configured to send an interrupt to the microprocessor upon reaching zero count. In the present embodiment the period between such interrupts is about 3 ms, as discussed hereinabove.

The maximum count (or start count) of the bit rate timer 57 is adjustable by the microprocessor 50 to allow for deviations in the bit rate of the data receiver 18a about the nominal 3 ms bit rate.

The microprocessor 50 is programmed to comprise an audio storage stack 58 as shown in FIG. 5. The audio storage stack 58 conveniently comprises 16 registers or memory locations of the microprocessor 50 providing 16 levels 60 of stack. Each level 60 of the stack 58 is configured to receive data representation of the period and the logic state of a cycle of the digital logic data at the output 46. The period being measured by the audio period timer 52. The audio storage stack 58 incorporates wrap-around so as to be an endless stack 58 having 16 current levels 60. Each falling edge in the digital logic data interrupts the microprocessor 50 and initiates a task referred to as TASK 1 which, inter alia directs the microprocessor 50 to take a reading of the count in the audio period timer 52 representative of a previous cycle of the digital logic data. The microprocessor 50 then under TASK 1 resets the audio period timer 52 to recommence counting to determine the period of a subsequent cycle of the digital logic data, until a further falling edge occurs, sending a further interrupt and so on.

The microprocessor 50 is also programmed to comprise a bandwidth window 62 as shown in FIG. 6. The bandwidth window 62 comprises four time period thresholds T1, T2, T3 and T4, respectively representing minimum audio period timer 52 count of a cycle to be a logic low, maximum audio period timer 52 count of a cycle to be a logic low, minimum audio period timer 52 count of a cycle to be a logic high and maximum audio period timer 52 count of a cycle to be a logic high.

Where the audio period timer 52 count of a cycle is below the threshold T1, between the thresholds T2 and T3, or above the threshold T4, the cycle is assumed to be undefined, such as by corruption by noise, and is labelled as undefined (UD in FIG. 6). Where the count of the cycle is between the thresholds T1 and T2 the cycle is determined by the microprocessor 50 to be a logic low. Where the count of the cycle is between the threshold T3 and T4 the cycle is determined to be a logic high.

As already described count period and frequency for a cycle are proportioned. Accordingly, where it is more instructive to do so the thresholds T1, T2, T3 and T4 of the bandwidth filter 62 will be related to frequency.

The logic level of the cycle at the output 46, as determined by the bandwidth window 62 is stored via an output 63 onto the audio stack 58 at level 60 with the period of the cycle. The microcomputer 50 is also programmed to comprise a clock extraction means 64. The clock extraction means 64 comprises a storage register 66 which is configured to contain a copy of the logic status of the last cycle of the digital logic data from the audio stack 58. The clock extraction also comprises a comparator 68 having one input connected to the storage register 66 and another input connected to the output 63 of the bandwidth window 62. The comparator 68 determines the similarity between the cycle just stored onto the stack 58 and the logic value of the last cycle stored in register 66. Where the current cycle is undefined the clock extraction means 64 aborts the comparison and activates an output 70. Where the comparator 68 determines that the last cycle on the stack 58 and the last cycle in the register 66 are identical it activates an output 72 to direct the microcomputer 50 to read the bit rate timer 57 via the output 57a to determine the count of the bit rate timer 57 at the end of the last cycle on the stack 58 and to store same in a register LSTTIM.

The 3 ms duration of the bit rate timer 57 lasts for about 4 cycles of logic low digital data and 5 cycles of logic high digital data. Where the comparator 68 determines that the last cycle on the stack 58 and the cycle in the register 66 are the same then the logic data cycle at the output 46 is still within or at the end of a logic bit. Thus the time in the register LSTTIM may represent the time at which an intermediate cycle of the data bit occurred or the time of the last cycle, that is the completion of the data bit. Such can not be determined until the next cycle at the output 46 is loaded onto the stack 58.

The comparator 68 also determines where the last cycle on the stack 58 and the last cycle in the register 66 are different and sets an output 74 active. The active output 74 indicates that a logic high bit to low bit or low bit to high bit transition occurred at the count stored in the register LSTTIM at the end of the previous cycle. The active output 74 is also used to route the new logic value into the register 66. It is to be noted that whilst there is no detected difference in the cycles there is no need to update the register 66.

Figure 7:
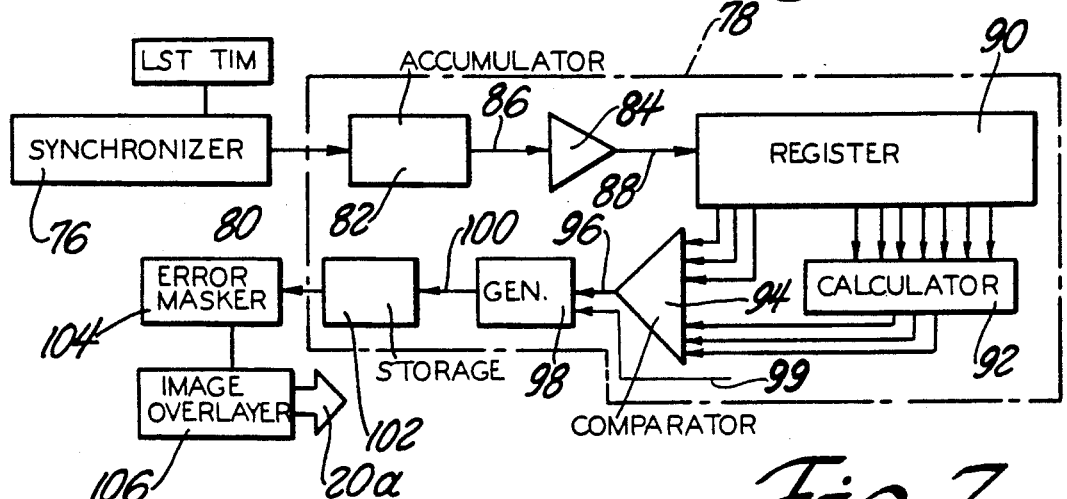
FIG. 7 is a diagram of a bit rate synchronizer means and a logic data decoder of the data receiver of FIG. 4.

This transition provides information as to the bit rate or clock of the modem 18 which transmitted the logic data. It must be noted that the bit rate extracted from the protocol of the transmission block TB will not be constant but will vary depending on whether the transition was a logic low to high or a logic high to low. Hence a phase error will exist between interrupts generated by the bit rate timer 57 and the bit rate extracted by the clock extraction means 64. The microcomputer 50 is also programmed to comprise a bit synchronization means, or bit synchronizer, 76 as shown in FIG. 7. The bit synchronization means 76 is connected to the output 57a so as to be activated upon receipt of an interrupt signal from the bit rate timer 57.

The bit synchronization means 76 reads the register LSTTIM and compares the value therein to the time of the interrupt. That is the bit synchronization means 76 determines the phase error between the actual bit rate extracted from the transmission block TB and the bit rate predicted by the bit rate timer 57.

Such prediction of the bit rate is required to obtain bit synchronization to aid in retrieval of data bits. Where there is a phase error the bit synchronization means 76 sends a signal via the output 57a to the bit rate timer 57 to increase or decrease the maximum count therein by a relatively small amount so as to increase or decrease the period of the bit rate timer 57 toward the actual rate extracted by the clock extraction means 64. Whilst the preamble PA is being received by the data receiver 18a the bit synchronization means 76 adds and subtracts counts from the bit rate time 57 at values say 10 times greater than those mentioned above so as to attempt to achieve reasonably close bit synchronization during the 180 ms of preamble PA.

A variable rate of change of the phase error between the bit rate timer 57 and the extracted bit rate so that when data is received errors in the extracted bit rate do not seriously offset the phase error.

This is depicted in FIG. 9 with time in 3 ms intervals shown on the abscina and phase error PE shown on the ordinate. Fast corrections or lock up is required during the preamble PA period and slow lock up during data reception.

In this sense the bit synchronization means 76 acts as a fixed rate phase locked loop (PLL). Operation on the sign of the phase error (i.e. leading or lagging) and not the value of the phase error. Such operation is required to create a degree of immunity for the bit synchronization means 76 to errors from erroneous extraction of the bit rate from the transmission block TB.

It is to be noted that the count in the bit rate timer 57 should not be made equal to the extracted bit rate since the extracted bit rate may be in error and such action would multiply such error.

It has been found that bit synchronization may be maintained provided more valid cycles are received that undefined cycles UD.

The microprocessor 50 is also programmed to comprise a logic data decoder 78 connected by an input 80 to the bit synchronization means 76. The logic data ,decoder 78 comprises a cycle accumulator means, or accumulator, 82 configured to read the logic values for the last four cycles of the logic data at the output 46 from the stack 58. The logic values of the last four cycles from the stack 58 serve to define the logic value of the bit of data just received. It is to be noted that more than four cycle may exist on the stack 58 and relate to the present bit, for example where noise creates extra cycles.

Due to noise problems and the like the last four levels 60 of the stack 58 may comprise logic values of logic high and logic low undefined UD logic levels are ignored. The logic data decoder 78 also comprises a logic level determination means 84 connected to the cycle accumulator means 82 by an input 86. The logic level determination means 84 is configured to total the occurrence of logic high values and logic low values read from the stack 58 by the cycle accumulator means 82 and to determine which is most frequent in the 4 cycles. The most frequent occurrence is used by the logic level determination means 84 as being the logic level of the received data bit.

In the present invention it is essential to have bit synchronization so that the logic level determination means 84 can read 4 cycles from the stack 58, which cycles relate to the last logic data bit.

The logic level determination means 84 comprises an output 88 which carries the determined logic value of the bit of data to a 10 bit shift register 90.

Consecutive cycles of the logic data at the output 47 are accumulated by the cycle accumulator means 82 and resultant bits of data stored in the 10 bit shift register 90. The last 3 bits to be stored into the 10 bit shift register 90 denote the parity bits for the byte of data.

The logic data decoder 78 also comprises a parity calculator means 92 connected to the 10 bit shift register 90 to calculate 3 parity bits for the 7 bits of data in the 10 bit shift register 90. A comparator 94 compares the calculated parity bits from the parity calculator 92 with the parity bits of the byte of data in the shift register 90 and sets an output 96 active to indicate coincidence or difference in the respective parity bits.

A flag code generator 98 is connected to the output 96 to replace a byte of data, via an input 99, for which the parity bits did not coincide, with an error code such as BF hex. Valid bytes of data, at the input 99, having coincident parity bits are unaffected by the flag code generator 98.

The flag code generator 98 has an output 100 connected to a storage means, or storage, 102 for further processing by the receiver 18a.

Such processing comprises monitoring of the rate of occurrence of error bytes. The data receiver 18a maintains an error count in a register, which error count is increased at the occurrence of an error byte and decreased at a valid byte. Where the error count exceeds a set value, such as, for example 50 all the received bytes are discarded. Such processing also comprises processing by a dynamic group length data byte error masking means 104 connected to the storage means 102. The error masking means 104 is configured to compare adjacent bytes of data of the transmission block TB in the storage means 102 and note the location of occurrences of bytes with error codes. The number of contiguous valid data bytes following a number of error coded bytes and preceding further error coded bytes is compared by the error masking means 104. Where the number of error coded bytes exceeds the number of valid bytes the valid bytes are assumed to be in error and are flagged by the error making means 104 as error bytes. For example, where two error flagged bytes are followed by one valid byte and one error coded byte, the valid byte is assumed to be questionable as a probable error byte and is flagged. In this manner the error masking means 104 is used to predict error spreading within received data of a transmission block TB.

Such processing also comprises a data packet image overlaying means 106 which is configured to overlay data packets DP's of a first transmission block containing error coded bytes with a second and further (say up to 8) data packet DP of a second and further re-transmissions of the same transmission block which may also comprise error coded bytes.

The image overlaying means 106 takes valid data bytes from all of the abovementioned data packets DP's and creates a new data packet DP, in a data packet image store of the microprocessor 50, comprising valid bytes from all such data packets DP's. In such manner a particular byte coded as an error byte in one data packet DP may be supplied by one of the other data packets DP's.

This process is called overlaying and is intended to result in complete integrity of received data through retransmission.

The data packet image overlaying means 106 is connected to the receiver output 20a to send the error corrected data packet DP to the host computer 20. The final data packet DP may also be used by the receiver 18a as described here The microprocessor is also programmed to comprise a receiver frequency offset error correction means 110 as shown diagramatically in FIG. 8.

The frequency offset error correction means 110 comprises a frequency analysis means configured to conduct a frequency analysis on the 16 cycles of data in the stack 58. Such analysis is conducted during the preamble PA of the transmission block TB.

The frequency analysis means reads periods contained on the stack 58 and compares the duration of a first cycle to every other cycle. In such comparison the frequency analysis means adds a narrow bandwidth window around the first cycle, such as for example about 0.4% of the period of the cycle (about 5 Hz in frequency terms). The frequency analysis means then counts the number of other cycles on the stack 58 which have a period within the window.

Such counts are made for all of the 16 cycles on the stack 58. Since two frequencies are used, namely 1415 Hz and 1585 Hz, two cycles having different period measurements generally appear as having the highest counts. The frequency analysis means then assumes the period of the two cycles having the highest counts to be the actual period for a logic low and for a logic high. This period relates to the frequency of the logic high and logic low cycles as described hereinabove.

Where the frequencies of the two cycles with the highest counts are more than 100 Hz apart or where the highest counts are above a set value, such as, for example 4 out of a possible 8, the error correction means 110 assumes valid two tone data communication is established.

Due to drift in the transceiver 16, the frequencies actually received may not precisely equal the nominal values of 1415 Hz and 1585 Hz. The departure is a drift error DE to allow correction of the frequency offset. The frequency analysis means adjusts the bandwidth window 62 so as to center on the two frequencies actually received.

The limits of the count of the audio period timer 52 for which said counts correspond to the thresholds T1, T2, T3 and T4 of FIG. 6 are calculated as follows:

$$\text{audio period timer limit} = \frac{XTAL}{Ti - De}$$

Where Ti is the nominal limit of the bandwidth window 62 namely
T1 = 1350 max logic low
T2 = 1480 min logic low
T3 = 1520 max logic high
T4 = 1650 min logic high XTAL is the frequency of the crystal for the microprocessor 50

DE is a count equivalent of the frequency offset error

The frequency offset error is assumed to be the same for both logic high and logic low cycles.

Since the bandwidth window 62 is adjusted by the frequency error offset correction means data having a frequency error offset of greater than half of the frequency difference between logic high and logic low cycles may still be received and correct for. It is envisaged that for the present embodiment correction for frequency error offset of up to $+/-200$ Hz may be possible during the pre-amble of the transmission block TB. Further, a frequency drift of up to 40 Hz during reception in a data block may also be possible. The data transmitter 18b of the modem 18 shares the microprocessor 50 with the data receiver 18a.

The data transmitter 18b also comprises an output 120 connected to a low pass filter 122, such as, for example, a two pale active tow pass filter. The output 120 carries digital audio data similar to that received at output 47 in the data receiver 18a. The filter 122 removes high order harmonics from the digital audio data to produce a band limited digital audio at an output 124.

The output 124 is coupled to a level amplifier 126 to amplify the signal from the filters 122.

An audio isolation and impedance watching transformer 128 is connected via input 130 to the amplifier 126. The transformer 128 is connected to the output 16b converted to the transceiver 16. The transformer 128 allows for balanced, grounded or unbalanced connection to the transceiver 16.

Data to be transmitted is placed byte-wise in the storage means 102 (FIG. 7) by the host computer 20 via the output 20b.

Figure 14:
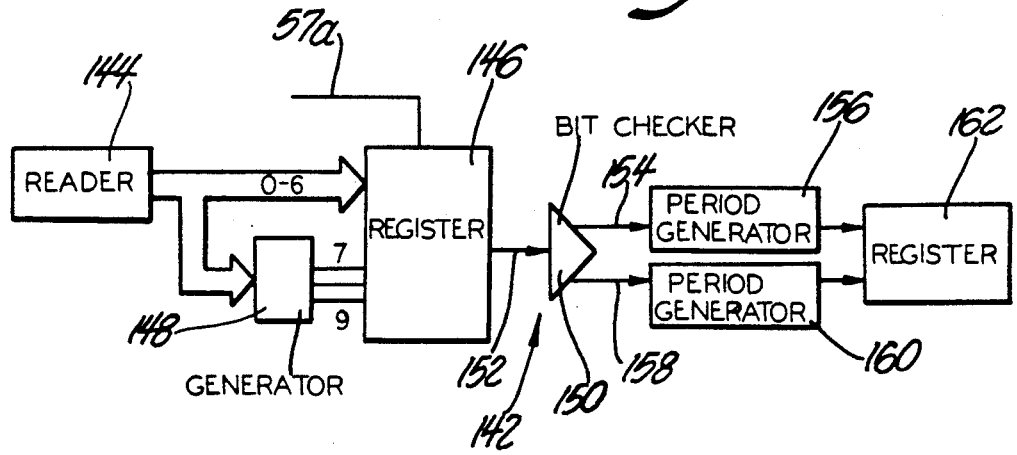
FIG. 14 is a diagram of an audio logic data encoder of the data transmitter of FIG. 12.

The microprocessor 50 is programmed to comprise an audio logic data encoder 142, as shown in FIG. 14. The encoder 142 is connected to be activated by an interrupt from the bit rate timer 57, which is set to operate at a period of 3 ms.

The encoder 142 comprises means 144 to read the next byte of 7 bits from the storage means 120. The 7 bits are then loaded into a 10 bit shift register 146 operating as a parallel to serial converter. A parity generator 148 calculates a 3 bit parity which is also loaded into the register 146.

Figure 13:
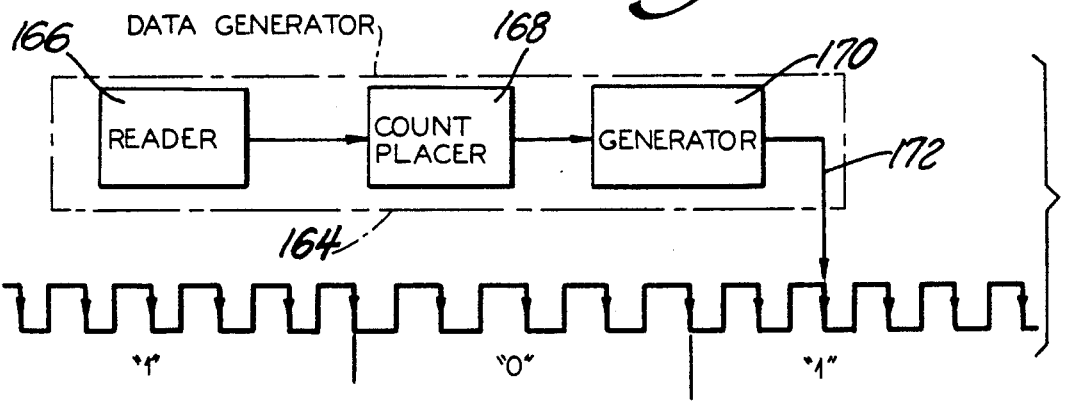
FIG. 13 is a diagram of an audio logic data generator of the data transmitter of FIG. 12.

A bit checking means 150 is connected to the register 14b by an output 152 thereof. The bit checking means 150 has an output 154 connected to a means 156 to generate the period for a logic low cycle and an output 158 connected to a means 160 to generate the period for a logic high cycle. A register 162 is connected to the means 156 and 160 and is configured to store the period of the cycle for later use. The microprocessor 150 is also programmed to comprise an audio logic data generation means, or generator, 164, as shown in FIG. 13. The data generation means 164 comprises means 166 to read the period of the next half cycle from the register means 162, and further means 168 to place such count into the audio period timer 52. The audio logic data generation means 164 comprises a cycle generator 170 connected to the means 168. The cycle generator 170 has an output 172 which is toggled at every half cycle. Preferably, in the present embodiment four complete cycles are generated for logic low data and five complete cycles are generated for logic high data. The output 172 is connected to the output 120 of the microprocessor 50.

Upon each interrupt from the bit rate timer 57 a further bit is encoded and a corresponding number of cycles generated at the output 172.

Whilst the last cycle for a bit is being generated at the output 172 a bit rate timer 57 interrupt directs the period count for the next bit into the register 162 for use by the data generation means 164 in generating cycles for that bit of data.

Once all of the bits from the register 146 have been transmitted a further byte of data is loaded onto the register 146.

The bits generated and transmitted by the data generation means 164 are phase coherent and each have 4 or 5 cycles of digital audio at 1415 Hz and 1585 Hz respectively. Phase coherence is essential to reduce distortion between bits of data and to aid in extraction of bit rate from the data by the data receiver by predicting bit transitions. It is intended that the modem 18 comprise a watch dog timer circuit arranged to receive pulses periodically generated by the microprocessor 50 (to indicate correct operation) and to reset the microprocessor 50 if a pulse is not received within a set time. Such may be of value when the microprocessor 50 locks up due to insufficient electrical power.

In use, data communication system 10 of the present invention is employed to transmit and receive data over relatively long distances, such as inter continental distances upon HF communication channels with a simplex single side band (SSB) HF transceiver 16.

As depicted in FIG. 2 the data may be transceived between personal computers 24, data loggers 26, mobile units 28 or mainframes 30 or the like.

Figure 8:
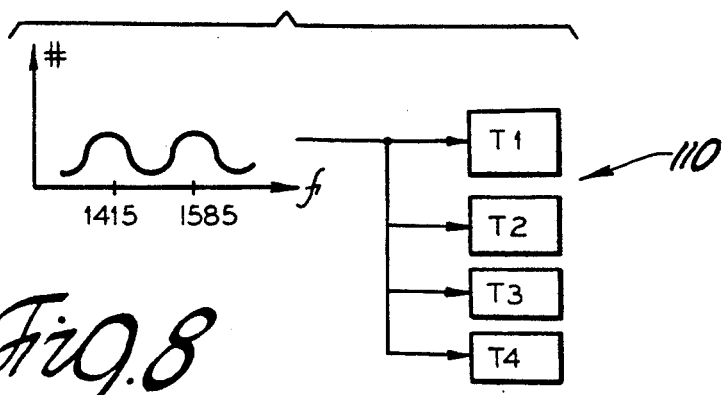
FIG. 8 is a diagram of a receiver frequency offset error correction means of the data receiver of FIG. 4.
Figure 15:
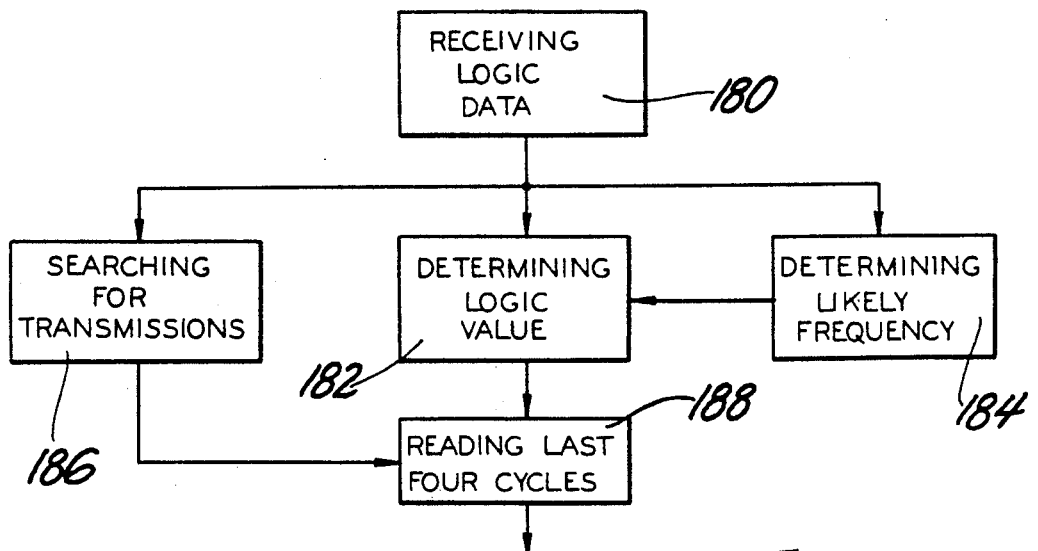
FIG. 15 is a flow chart of bit synchronization and bit reconstruction for the data receiver of FIG. 4 and corresponding to FIGS. 5 and 6.

Referring now to FIGS. 15 to 19 the operation of the data receiver 18a in receiving and decoding bytes is described. In FIG. 15 there is shown a process for bit demodulation from a received transmission block the process comprising functional blocks 180 to 188. At functional block 180 the data receiver 18a receives filtered and squared-up digital audio logic data with cycles predominantly about two frequencies (FIGS. 4 and 8). The audio period timer 52 measures the period of each of the cycles upon receipt and creates a count representative of such period.

In the functional block 182 the logic value for each cycle is determined by the bandwidth filter 62 (FIG. 6) and stored at one of the levels 60 on the audio stack 58 (FIG. 5).

At the same time in functional block 184 the frequency error correction means 8 reads the 16 levels 60 of the stack 58 and conducts a simple frequency analysis to determine the likely frequency of logical high cycles and logical lower cycles. In the functional block 184 the data on the stack is that of the preamble PA (FIG. 3) of the transmission block TB.

Once the likely frequencies are determined, as described hereinabove, they are compared to nominal frequencies of 1415 Hz and 1585 Hz for logical low and high cycles, respectively and a drift error DE is calculated. The drift error DE is used in functional block 182 to adjust the thresholds T1, T2, T3 and T4 of the bandwidth window 62 (FIG. 6).

At the same time in functional block 186 the clock extractor means 64 searches for transitions from one bit to another bit of opposite logic value. The time of the occurrence of the transition is noted and the maximum count value of the bit rate timer 57 is adjusted.

The adjustment is by a slight increase in the count where the bit rate timer 57 leads the extracted bit rate and vice versa where the bit rate timer 57 leads.

In the preamble PA segment of the transmission block TB the phase error between the extracted bit rate and the bit rate of the timer 57 may differ dramatically. To achieve relatively rapid lock-up of the bit rate timer 57 to the extracted rate greater changes are made to the maximum count of the bit rate timer 57.

Once bit synchronization is close to being achieved the size of the count alterations may be reduced to give slower lock-up (FIG. 9) with better immunity to erroneous logic transitions.

Then in functional block 188 the cycle accumulator 82 reads the last four cycles from the stack 58 and the logic level determination means 84 determines the logic value of the bit of data from the cycles (FIG. 7). Undefined cycles are ignored and where the number of logical high and logical low cycles is the same the bit is assumed to be a logical high. A bit of data is by the process of FIG. 15 received and demodulated.

Figure 16:
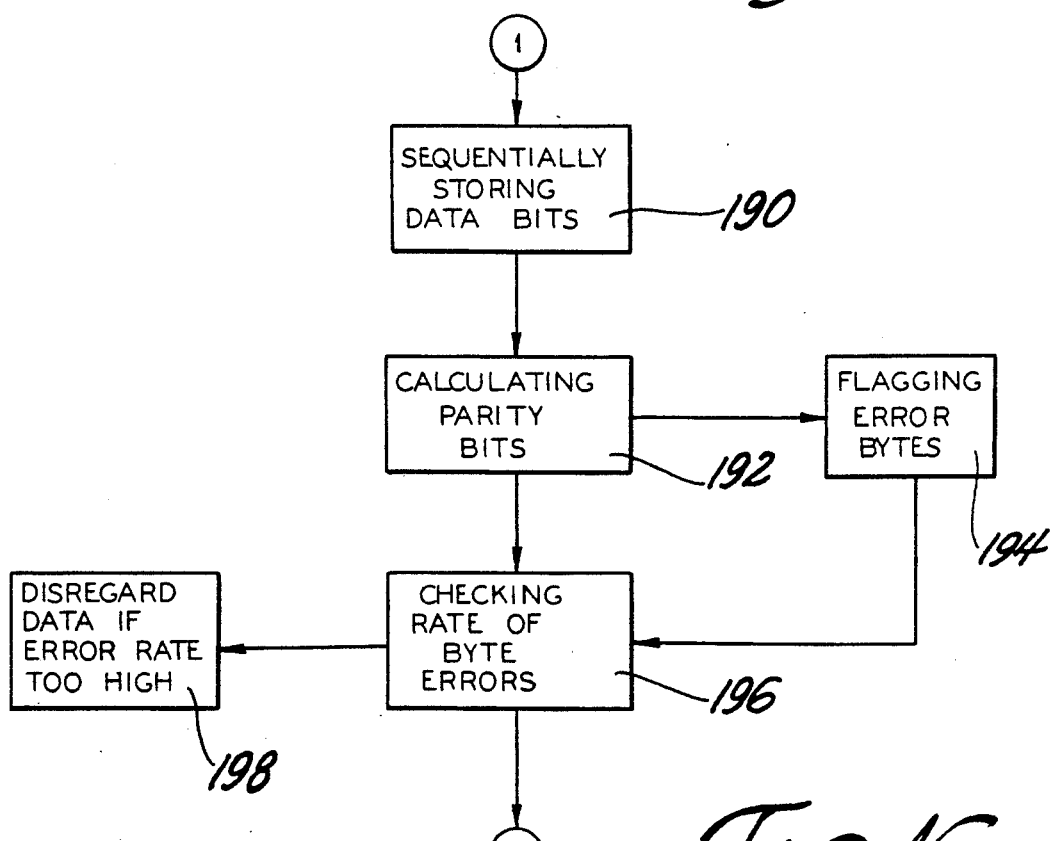
FIG. 16 is a flow chart of byte reconstruction or logic data decoding for the data receiver of FIG. 4 and corresponding to FIG. 7.

In FIG. 16 there is shown a process for synchronous decoding of bytes of data, the process comprising functional blocks 190 to 198.

In functional block 190 indirected data bits from the results of the process of FIG. 15 are stored sequentially into the shift register 90, the bits including 7 data bits and 3 parity bits. In functional block 192 the parity generation means 92 calculates the parity bits for the 7 data bits. The calculated parity bits are compared with the received parity bits and where there is a difference in the parity bits the functional block 194 flags the byte as an error byte.

The rate of byte errors is then checked in functional block 196 and if the rate is too high the functional block 198 directs the data receiver 18a to disregard the received data bytes. The received data bytes, of 7 bits, are placed in the storage means 102 for further processing.

Figure 17:
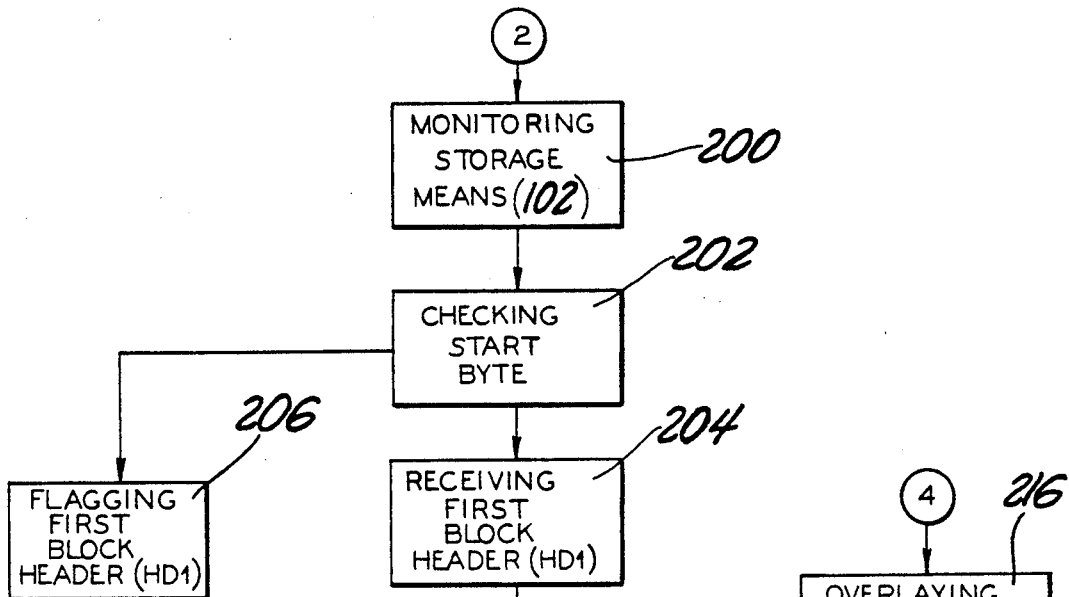
FIG. 17 is a flow chart cf byte synchronization for the data receiver of FIG. 4.

In FIG. 17 there is shown a process for byte synchronization, the process comprising functional blocks 200 to 206.

In functional block 200 the data receiver 18a monitors the storage means 102 looking for the first start byte ST1 so as to synchronize following bytes of data.

In functional block 202 the value of the start byte is checked to determine if it is the first start byte ST1 or the second start byte ST2. The functional block 204 then awaits receipt of the first block header HD1.

Figure 18:
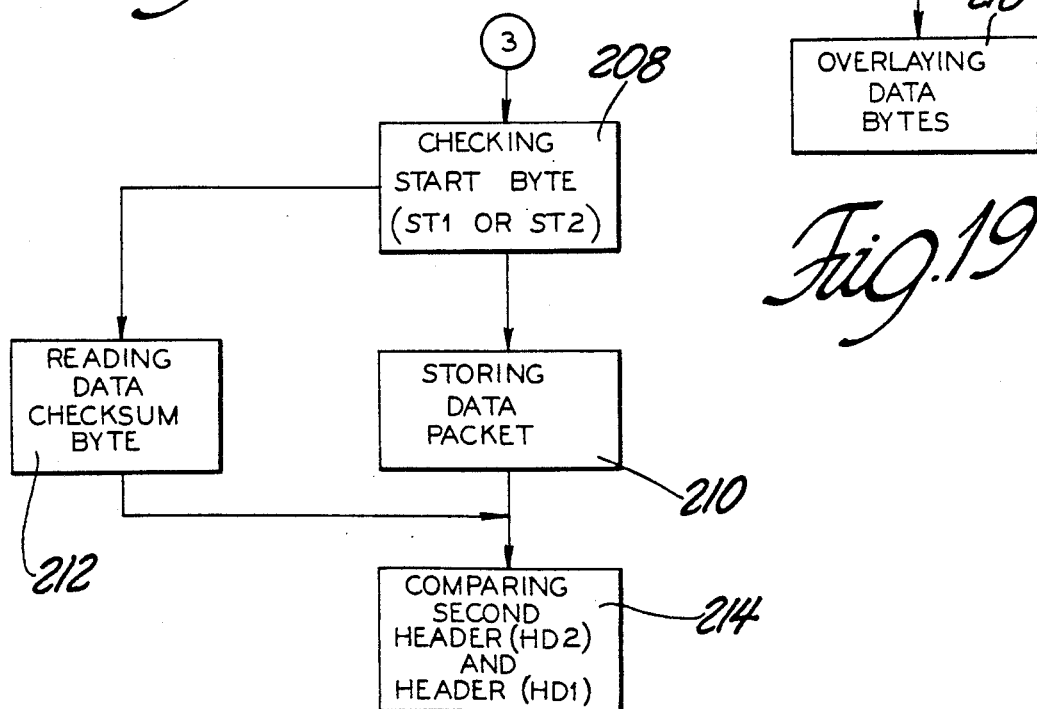

The functional block 206 flags the first block header HD1 as not received where the first start byte ST1 is not received. In FIG. 18 there is shown a process for receival of a transmission block TB, the process comprising functional blocks 208 to 214.

In functional block 208 the start byte ST1 or ST2 is checked by the data receiver 18a to determine if the transmission block TB is a SHORT block (ST1=01 hex, ST2=02 hex) or a LONG block (ST1=03 hex, ST2=04 hex), indicating whether the data pocket DP has 0 bytes or 128 bytes.

In functional block 210 the data packet DP of 128 bytes is stored into the storage means 102. In functional block 212 the data checksum byte in the header HD1 is read to see if data was transmitted therein, such as a SELCALL command. In functional block 214 the second header HD2 is compared with header HD1 for further error correction.

Figure 19:
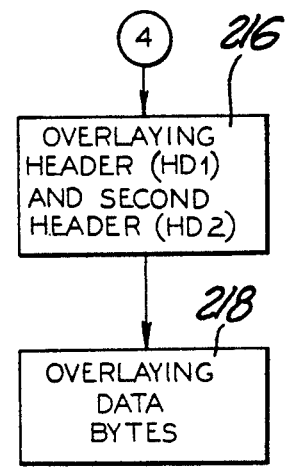
FIG. 18 and 19 are flow charts of reception of a transmission block by the data receiver of FIG. 4.

In FIG. 19 there is shown a process for further processing of the received data in the storage means 102, the proces comprising functional blocks 216 and 218. In functional block 216 the two headers HD1 and HD2 are overlayed to attempt to remove error bytes. The destination identification DID bytes are checked to determine if the received data is for the particular modem 18.

In functional block 218 the data bytes in the transmission block TB (excluding error bytes) are overlayed with a re-transmitted version or versions of the same transmission block TB, in order to build up an error free transmission block.

In FIG. 10 there is shown typical durations for various of the above processes, wherein waveform A signifies time taken searching for pre-amble PA, waveform B signifies time for determination of frequency error offset and adjustment of the bandwidth window 62, waveform C signifies time taken for rapid bit synchronization, waveform D signifies time taken in searching for the start byte and waveform E signifies time for retrieval of the transmission block TB.

Figure 11:
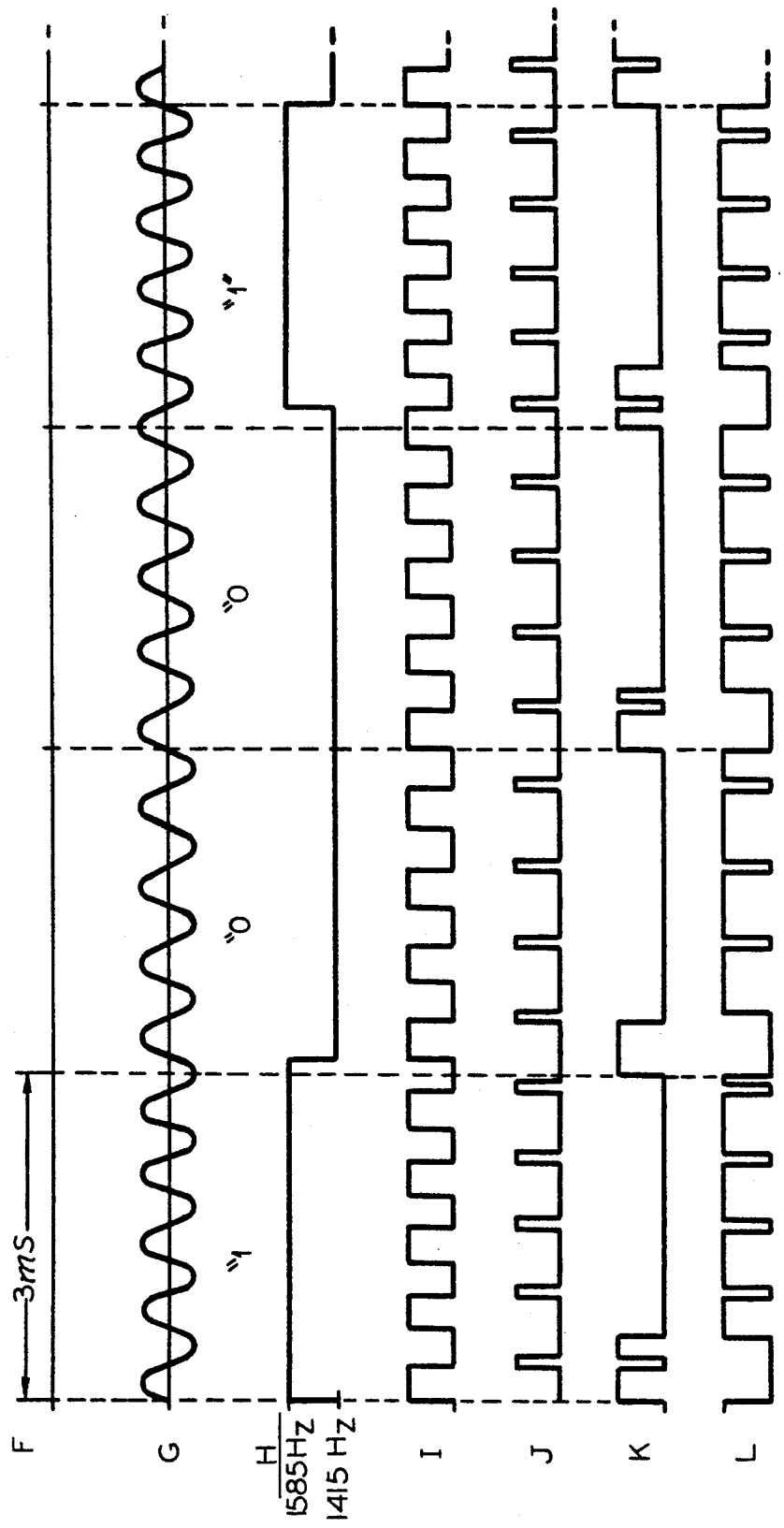
FIG. 11 is a timing diagram of task servicing for the data receiver of FIG. 4.
Figure 12:
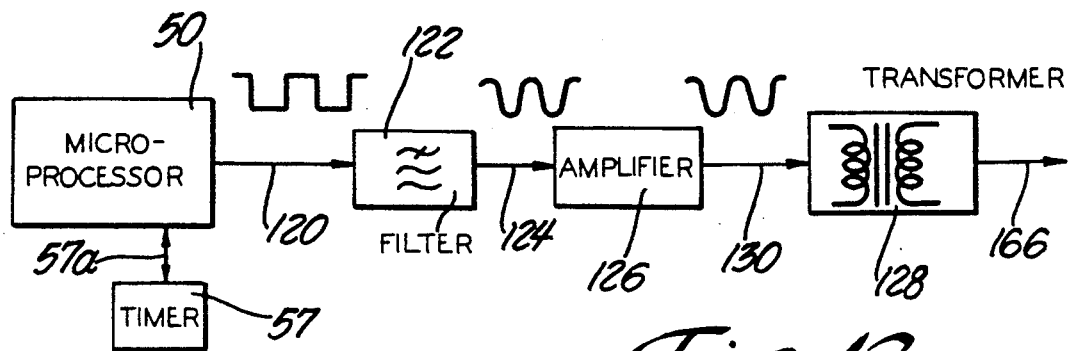
FIG. 12 is a block diagram of a data transmitter of the modem of FIG. 1.

In FIG. 11 there is shown typical timing diagrams for the present invention, wherein waveform F signifies real time in 3 ms spaces, waveform G signifies received audio logic data, waveform H signifies actual frequency of the received audio logic data, waveform I signifies squared audio at the output 47, waveform J signifies the interrupts taken from the falling edges of waveform I to process the cycles according to the process of FIG. 15, waveform K signifies interrupts taken from the bit rate timer 57 predicting a change in logic state for the data and waveform L signifies time available to the microprocessor 50 to conduct other tasks. By use of the present invention data may be transmitted, and errors corrected for, over intercontinental distances of HF radio waves. Since the apparatus 10 of the present invention is capable of operating in HF media it is also capable of operating effectively in other radio media such as VHF or UHF which are generally less hostile.

Modifications and variations such as would be apparent to a skilled address are deemed within the scope of the present invention.

I claim:

1. A modem for a data communication apparatus, said modem being arranged for connection between a source of band limited audio logic such as a radio transceiver and a host computer, the modem characterized in that it comprises:

(A) a data receiver having:
 (a) a band pass filter having an input arranged to be connected to the source of band limited audio logic,
 (b) a squaring circuit connected to an output of the band pass filter to produce a substantially square wave signal comprising a plurality of cycles with rapid zero crossings, said cycles forming logic bits of data with changes of state between a logical high and a logical low value and said logic bits of data forming logic bytes of data;
 (c) an audio period timer connected to an output of the squaring circuit and configured to develop a count indicative of the time delay between consecutive zero crossing in the same direction;
 (d) a bandwidth window configured to receive the count from the audio period timer, and to filter the counts to detect when the bits of data have one of the changes of state from a logical high to a logical low and vice versa;
 (e) a bit rate timer configured to develop a further count and to issue an interrupt signal to predict when the bits of data have one of the changes of state from a logical high to a logical low and vice versa;

(f) a bit rate synchronization means responsive to said changes of state of the data bits and configured to alter the bit rate timer when the predicted time at which said changes of state occur does not coincide with the actual changes of state, so as to establish synchronous bit-wise synchronous communication;

(B) a data transmitter having:

(a) generator means to generate said cycles for said bits of data; and (b) lower pass filter means connected to receive the cycles from the generator means to filter out high frequency components from the generated cycles to produce a bandlimited audio frequency logic signal.

2. A modem according to claim 1, characterized in that the bandwidth window comprises four count thresholds defining two bands within which said count relates to one of the logical high valued cycles or one of the logical lower valued cycles, and without which said count relates to an undefined logical value for said cycle.

3. A modem according to claim 1, characterized in that the data receiver comprises an audio stack having a plurality of levels, said audio stack being configured to store one of said counts and a corresponding one of said logical values for one of the cycles in each of the levels, the audio stack being formed in an endless loop so that adjacent ones of the levels contain counts and logical values for adjacent ones of the cycles.

4. A modem according to claim 3 characterized in that the bit rate synchronization means of the data receiver comprises a comparator, a first data register and a second data register, the first data register having a store representative of the logical value for a most recent cycle stored on the audio stack, the comparator being connected to compare the logical value in the first register with a logical value output from the bandwidth window for a present cycle, the comparator being responsive to such logical values such that where the logical values are identical it loads the further count of the bit rate timer for said present cycle into the second register, and the comparator being responsive to said logical values such that where they are different the comparator loads the count for said most recent cycle from the audio stack into the second register to signify one of said changes in logic state for the bits of data.

5. A modem according to claim 4, characterized in that the bit rate synchronization means comprises means for comparing the count in the second register with the further count of the bit rate timer to determine a phase error therefor, and a further means for altering the bit rate timer by a fixed amount relative to the absolute phase error to synchronize the bit rate timer to said bits of data.

6. A modem according to any one of the claim 3, characterized in that the data receiver comprises a frequency offset error correction means configured to read all of the counts from the audio stack, the frequency offset error correction means comprises a frequency analysis means configured to determine two counts, one count relating to a most probable count for one of the logical high valued cycles and another count relating to a most probable count for one of the logical low valued cycles, the frequency offset error correction means being configured to compare the said two counts with two default counts to determine an error value therefor, the frequency offset error correction means being further configured to alter the count thresholds an amount substantially equal to the error value so as to align the bandwidth window with the cycles.

7. A modem according to claim 6, characterized in that the frequency analysis means is configured to generate a relatively narrow time window about each of the counts, the frequency analysis means is also configured to determine how many of the other counts occur within each said time window, the frequency analysis means is further configured to determine that the time windows with the largest occurrence of other counts therewithin are the said most probable counts for the logical high valued cycles and the logical low valued cycles.

8. A modem according to any one of the preceding claims 2 to 7, characterized in that the data receiver comprises a cycle accumulator means responsive to the interrupt signal from the bit rate timer, the cycle accumulator means being configured to read the logical values from the audio stack for a desired number of most recent cycles, and a logic level determination means configured to compare the said logic values and to determine which of the two logical values predominates, such predominant logical value being determined to be the logical value for the bit of data which said most recent cycles relate.

9. A modem according to claim 8, characterized in that the logical low valued bits comprises 4 cycles and the logical high valued bits comprise 5 cycles, the period of the cycles for the low valued bits being greater than the period of the cycles for the high valued bits.

10. A modem according to claim 5, characterized in that the bit rate synchronization means is responsive to data bits of the preamble type such that the amount by which the bit rate timer is altered to compensate for said phase error is substantially greater than for other forms of data bits such as to increase the rate of achievement of bit-wise synchronous communication during said preamble.

11. A data communication system according to claim 1, characterized in that said system comprises a transceiver, a computer means and a modem connected therebetween.

12. A data communication system according to claim 11, characterized i that the transceiver is of the high frequency single side band type.

* * * * *